(12) United States Patent
Savary et al.

(10) Patent No.: US 11,124,425 B2
(45) Date of Patent: Sep. 21, 2021

(54) ALKALI METAL BICARBONATE PARTICLES WITH INCREASED DISSOLUTION TIME

(71) Applicant: SOLVAY SA, Brussels (BE)

(72) Inventors: David Jean Lucien Savary, Sérézin-du-Rhône (FR); Jean-Yves Seguin, Rosieres aux Salines (FR); Karine Cavalier, Dombasle-sur-Meurthe (FR)

(73) Assignee: Solvay SA, Brussels (BE)

( * ) Notice: Subject to any disclaimer, the term of this patent is extended or adjusted under 35 U.S.C. 154(b) by 314 days.

(21) Appl. No.: 15/538,765

(22) PCT Filed: Dec. 22, 2015

(86) PCT No.: PCT/EP2015/081052
§ 371 (c)(1),
(2) Date: Jun. 22, 2017

(87) PCT Pub. No.: WO2016/102603
PCT Pub. Date: Jun. 30, 2016

(65) Prior Publication Data
US 2017/0349446 A1    Dec. 7, 2017

(30) Foreign Application Priority Data

Dec. 22, 2014    (EP) .................................... 14199914

(51) Int. Cl.
| C01D 7/38 | (2006.01) |
| C01D 7/00 | (2006.01) |
| C01D 7/22 | (2006.01) |
| A23L 29/00 | (2016.01) |
| B01J 13/04 | (2006.01) |
| C08J 9/08 | (2006.01) |

(52) U.S. Cl.
CPC .............. C01D 7/38 (2013.01); A23L 29/015 (2016.08); B01J 13/04 (2013.01); C01D 7/00 (2013.01); C01D 7/22 (2013.01); C08J 9/08 (2013.01); A23V 2002/00 (2013.01); C01P 2002/88 (2013.01); C01P 2004/51 (2013.01); C08J 2203/02 (2013.01)

(58) Field of Classification Search
CPC . C01D 7/38; A23L 29/015; B01J 13/04; C08J 9/08; C08J 2203/02; A23V 2002/00; C01P 2002/88; C01P 2004/51
USPC ........................................................ 426/653
See application file for complete search history.

(56) References Cited

U.S. PATENT DOCUMENTS

| 2,372,402 | A |  | 3/1945 | Stokes et al. |
| 5,411,750 | A |  | 5/1995 | Lajoie et al. |
| 5,482,702 | A |  | 1/1996 | Murphy et al. |
| 6,333,373 | B1 | * | 12/2001 | Rouse ........................ B01J 2/00 523/335 |
| 7,909,272 | B2 | * | 3/2011 | Thijssen ............ B01D 53/1456 241/16 |
| 2014/0148572 | A1 |  | 5/2014 | Zhao et al. |

FOREIGN PATENT DOCUMENTS

| CN | 1076425 A | 9/1993 |
| CN | 101346311 A | 1/2009 |
| WO | WO 2007/071666 A1 | 6/2007 |
| WO | WO 2009/038340 A1 | 3/2009 |
| WO | WO 2014/096457 A1 | 6/2014 |
| WO | WO 2015/118166 A1 | 5/2015 |
| WO | WO 2016/102591 A1 | 6/2016 |

OTHER PUBLICATIONS

U.S. Appl. No. 12/158,258, Thijssen et al., filed Jun. 19, 2008.
U.S. Appl. No. 14/653,616, Savary et al., filed Jun. 18, 2015.
U.S. Appl. No. 15/114,588, Thijssen et al., filed Jul. 27, 2016.
U.S. Appl. No. 15/538,769, Savary et al., filed Jun. 22, 2017.

* cited by examiner

*Primary Examiner* — Hamid R Badr
(74) *Attorney, Agent, or Firm* — Osha Bergman Watanabe & Burton LLP

(57) ABSTRACT

Powder compositions comprising alkali metal bicarbonate particles and an additive. A process for preparing alkali metal bicarbonate particles by spray-drying of an aqueous solution or suspension comprising 1-10% by weight of alkali metal bicarbonate and a resin acid or a fatty acid as additive. A process for preparing alkali metal bicarbonate particles by co-grinding the alkali metal bicarbonate in the presence of a resin acid as additive. A process for preparing alkali metal bicarbonate particles by fluidized bed coating of the alkali metal bicarbonate in the presence of a resin acid, fatty acid or a wax as additive.

15 Claims, No Drawings

ALKALI METAL BICARBONATE PARTICLES WITH INCREASED DISSOLUTION TIME

CROSS-REFERENCE TO RELATED APPLICATIONS

The present application is a U.S. national stage entry under 35 U.S.C. § 371 of International Application No. PCT/EP2015/081052 filed Dec. 22, 2015, which claims priority to European Patent Application No. 14199914.4 filed Dec. 22, 2014, the whole content of this application being incorporated herein by reference for all purposes.

FIELD OF THE INVENTION

The invention relates to powder compositions comprising alkali metal bicarbonate particles and a resin acid or a fatty acid as additive. The invention also relates to a process for preparing alkali metal bicarbonate particles by spray-drying of an aqueous solution or suspension comprising 1-10% by weight of alkali metal bicarbonate and a resin acid or a fatty acid as additive. The invention further relates to a process for preparing alkali metal bicarbonate particles by co-grinding the alkali bicarbonate in the presence of a resin acid as additive.

PRIOR ART

Alkali metal bicarbonate particles, such as sodium bicarbonate particles and potassium bicarbonate particles, are known in the art. These products have many properties which make them interesting and extensively used in several technical fields, such as pharmaceutical industry, the feed and food industry, in detergents and in the treatment of non-ferrous metals.

The most common way to manufacture bicarbonate particles is crystallization by carbonization with carbon dioxide of a solution or suspension of the corresponding alkali metal (sodium or potassium carbonate for example) or a solution or suspension of the hydroxide of the corresponding alkali metal. It is also common to crystallize bicarbonates by controlled cooling of bicarbonate solutions or suspensions, or by evaporating the solvent of such solutions or suspensions.

For the industrial use of alkali metal bicarbonate particles control of specific properties of the particles, e.g. their dissolution time is required.

Methods to control some parameters of alkali metal bicarbonate particles, such as a bulk density are known in the art. E.g. U.S. Pat. No. 5,411,750 discloses a method of producing sodium bicarbonate powder with a bulk density between 70 and 500 kg/m$^3$. The particles are prepared by spray-drying a dilute aqueous solution or suspension of the bicarbonate with an alkali metal salt as additive.

WO 2014/096457 discloses a method for producing sodium bicarbonate particles by spray-drying of an aqueous solution comprising 1-10% by weight of sodium bicarbonate in an additive selected from the group consisting of magnesium salt, sodium alkyl benzene sulfonat and soybean lecithin.

While the alkali metal bicarbonate particles produced by spray-drying are generally fine particles, they typically dissolve rapidly in aqueous media. Therefore, there is still the need for powder compositions comprising alkali metal bicarbonate particles and methods for the preparation thereof, which do not shows the above disadvantages, and which particles in particular show increased duration of dissolution.

BRIEF SUMMARY OF THE INVENTION

It has been surprisingly found that when resin acids or fatty acids or waxes are used as additive during preparation of alkali metal bicarbonate particles, in particular in encapsulation processes such as spray-drying, co-grinding or fluidized bed coating, the obtained particles show an excellently increased duration of dissolution and excellent $CO_2$ release properties.

The present invention therefore relates to a process for preparing alkali metal bicarbonate particles by spray-drying of an aqueous solution or suspension comprising 1 to 10% by weight of the alkali metal bicarbonate and 1 to 10,000 ppm of a resin acid or a fatty acid, or salt thereof.

The present invention also relates to a process for preparing alkali metal bicarbonates by co-grinding of the alkali metal bicarbonate in the presence of 0.1 to 20, preferably 0.1 to 10 parts by weight of a resin acid, or salts thereof, per 100 parts by weight of the substance undergoing milling.

The present invention also relates to a process for preparing alkali metal bicarbonates by fluidized bed coating wherein the alkali metal bicarbonate is coated in the presence of 0.1 to 20, preferably 0.1 to 10 parts by weight of a resin acid a resin acid or a fatty acid, or salts thereof, or a wax, per 100 parts by weight of the alkali metal bicarbonate to be coated.

The present invention also relates to the alkali metal bicarbonate particles obtained by these processes, as well as the use of a resin acid and a fatty acid and a wax as additive for increasing the dissolution time of alkali metal bicarbonate particles and for providing alkali metal bicarbonate particles with excellent $CO_2$ release properties.

The present invention also relates to the use of the alkali metal bicarbonate particles obtained by these processes as a leaving agent for food and as a foaming agent for polymers.

Definitions

In the present description, wherein an element or composition is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components.

Further, it should be understood that elements and/or features of an apparatus, a process or method described herein can be combined in a variety of ways without departing from the scope and disclosures of the present teachings, whether explicit or implicit herein.

As used herein, the term "about" refers to a ±10% variation from the normal value unless specifically stated otherwise.

The term "comprising" includes "consisting essentially of" and "consisting of".

The term "ppm" means parts per million, expressed by weight (e.g. 1 ppm=1 mg/kg).

The sign "%" refers to "weight percent" unless specifically stated otherwise.

As used herein "in spherical shape" refers to particles with shape on an electron scanning microscope has an ovoid shape with larger diameter to smaller diameter ratio of less than 1.4.

As used herein "bulk density" refers to loose bulk density and can be determined according to ASTM D7481-09 "method A" unless specifically stated otherwise. Tapped density can also be determined according to ASTM D7481-09 "method A" unless specifically stated otherwise.

As used herein "dissolution time" is measured with a conductivity meter diving cell in a beaker stirred with 1 liter (1000 ml±1 g) deionized water at 25° C.±0.5° C. The stirring speed is 350 rpm, the geometry of the stirrer (4 vertical blades) is: height 11 mm, diameter 42 mm. Each blade measures 20 mm in length and 10 mm in height. The beaker has a diameter of 100 mm. The gap between the blades and the bottom of the beaker is 10 mm. The conductivity meter is positioned at 40 mm of the stirrer axis and 20 mm under the liquid surface. 10 g±0.05 g of the particles, e.g. the alkali metal bicarbonate particles, are introduced into the solution or suspension. Upon dissolution, the conductivity of the solution or suspension increases. The "dissolution time" is the time (starting with introduction of the particles into the solution) required to reach 95% of the final value of the conductivity upon complete dissolution of the particles.

The $CO_2$ release properties of the alkali metal bicarbonate particles of the present invention can be determined by performing a thermogravimetric analysis (TGA) of an alkali metal bicarbonate particles sample, measuring the weight loss of the sample in dependence of the temperature. The $CO_2$ release properties are characterized by the derivate value for weight loss depending on the temperature. The $CO_2$ release beginning temperature is the temperature where the derivate value for weight loss starts to raise. The $CO_2$ release maximum temperature is the temperature where the derivate value for weight loss is at maximum. Typically, heating is performed between 30° C. and 250° C. at a speed of 10° C./min. Thermogravimetric analysis can e.g. be performed on an STD Q600 V20.9 Build 20 thermogravimetric analysis instrument (provided by TA Instruments).

DETAILED DESCRIPTION OF THE INVENTION

The present invention relates to a process for preparing alkali metal bicarbonate particles by spray-drying. Spray-drying or drying by atomization is a drying technique. This method comprises spraying the product to be dried, which is in the form of a solution (or a suspension) in a stream of hot gas, so as to obtain a powder in a few seconds or fractions of seconds. The separation of a solution or suspension into fine droplets gives rise to a large material transfer surface and it leads to rapid evaporation of the solvent of the solution or suspension used.

Suitable apparatuses for spray-drying are known in the art, and generally comprise several modules: a module comprising a circuit for storing and atomizing the solution or suspension comprising equipments for atomizing or spraying the solution or suspension, a module for the preparation of hot gas and its transfer to a drying chamber where it comes into contact with the sprayed solution or suspension, a drying chamber where the sprayed solution or suspension is evaporated and the particles are formed, and a module for collecting the particles, generally comprising a cyclone and/or a suitable filter.

Generally, the equipment for atomizing or spraying the solution or suspension is a compressed gas sprayer or a dispersion turbine. Also ultrasound nozzles can be used for spraying the solution or suspension.

In the process of the invention generally an aqueous solution or suspension of the bicarbonate is used. While other polar solvents or mixtures of polar solvents, for examples mixtures of water and ethanol, in which the additive is soluble or suspendable, may be used, water is the preferred solvent.

In the method of the present invention the aqueous solution or suspension to be spray-dried comprises 1 to 10% by weight of the alkali metal bicarbonate. The alkali metal bicarbonate is preferably sodium bicarbonate or potassium bicarbonate, in particular sodium bicarbonate. The solution or suspension to be spray-dried further comprises 1 to 10,000 ppm of a resin acid or a fatty acid, or a salt thereof. Preferably, the content of the resin acid or the fatty acid as additive in the solution or suspension to be spray-dried is 1 to 5,000 ppm, more preferred 1 to 3,000 ppm, in particular 10 to 2,000 ppm, e.g. 50-1,000 ppm of additive per kg of solution or suspension to be spray-dried. Generally, the aqueous solution or suspension comprises at least 1 mg, preferably at least 5 mg, more preferably at least 10 mg, even more preferred at least 100 mg of the additive per kg of aqueous solution or suspension. Generally, the aqueous solution or suspension comprises at most 2,000 mg, preferably at most 1,500 mg, more preferably at most 1,200 mg of the additive per kg of aqueous solution or suspension. In case of salts, amounts, e.g. weight percentages are given based on the free acid.

Generally, the resin acids to be used as additive in accordance with the present invention is one of the resin acids as known in the art. The resin acids refer to mixtures of related carboxylic acids, preferably abietic acid, found in tree resins. Typically, resin acids have the basic skeleton of three fused rings with an empirical formula $C_{19}H_{29}COOH$. Preferred the resin acid is a tricyclic diterpene carboxylic acid, more preferable belonging to the abietane diterpene group. Preferred resin acids are abietic-type acids, e.g. selected from the group consisting of abietic acid (abieta-7,13-dien-18-oic acid), neoabietic acid, dehydroabietic acid, and palustric acid. Also suitable are pimaric-type acids, selected from the group consisting pimaric acid (pimara-8 (14), 15-dien-18-oic acid), levopimaric acid, or isopimaric acid. Such acids are available from natural sources or via chemical synthesis as e.g. known from US 2014/0148572 A1.

A derivative containing resin acids that may be used in accordance with the present invention is tall oil. Tall oil (also called liquid rosin) is obtained as a by-product of the Kraft process of wood pulp manufacture. Crude tall oil contains rosin, resin acids (mainly abietic acids and its isomers), fatty acids (mainly palmetic, and oleic), fatty alcohols, sterols and alkyl hydrocarbon derivatives. Most preferred abietic acid, pimaric acid and their salts, in particular the sodium salts, respectively are used as additive in accordance with the present invention.

Fatty acids as used as additive in the process of the present invention are those fatty acids as known in the art, i.e. a carboxylic acid with an aliphatic residue, which is either a saturated or unsaturated. Preferred, the fatty acid is a compound according to formula (I)

R—COOH (I)

wherein R is a saturated or unsaturated $C_6$-$C_{18}$ alkyl group, preferably a $C_{12}$-$C_{16}$ alkyl group. The fatty acids may be used in form of their salts, in particular sodium or potassium salts, most preferably sodium salt. Even more preferred residue R is a $C_{16}$-$C_{18}$ alkyl group, most preferred, the fatty acid is palmetic acid or stearic acid, the latter being most preferred.

Generally, in the process of the invention the aqueous solution or suspension comprises at least or more than 1%, preferably at least or more than 2%, more preferably at least or more than 3%; even more preferably at least or more than 4%, in particular at least or more than 5% by weight of alkali metal bicarbonate. Preferably the alkali metal bicarbonate is sodium bicarbonate or potassium bicarbonate, in particular sodium bicarbonate. A high concentration of alkali metal bicarbonate in the aqueous solution or suspension is detrimental as leading to high speed plugging of the spraying or atomizing device. Therefore it is generally recommended that the aqueous solution or suspension comprises at most or less than 10%, preferably at most or less than 8%, more preferably at most or less than 6% of alkali metal bicarbonate, in particular sodium bicarbonate. Preferably, the alkali metal bicarbonate solution or suspension is an aqueous solution or suspension comprising 1%-10%, advantageously 3%-8%, more advantageously 4%-6% per weight of the alkali metal bicarbonate.

The drying with a hot gas breaks part of the alkali metal bicarbonate down into the form of sodium carbonate, $CO_2$ and water. In one advantageous embodiment of the present invention, the spray-drying is carried out in a gas comprising at least 5%, advantageously at least 10%, more advantageously at least 20%, and even more advantageously at least 30% of $CO_2$ by volume on a dry gas bases. This enables to limit the alkali metal bicarbonate decomposition into alkali metal carbonate solid and $CO_2$ and water gasses. Generally, the spray-drying is carried out with a gas preheated between 40° C. and 220° C. Advantageously the spray-drying is carried out in a spray-drying chamber and wherein the gas is preheated before being introduced into the spray-drying chamber at least 40° C., preferably at least 50° C., more preferably at least 60° C., even more preferably at least 70° C. Also advantageously, the gas is preheated before being introduced into the spray-drying chamber at most 220° C., preferably at most 200° C., more preferably at most 180° C., even more preferably at most 130° C.

It is preferable for the temperature of the gas after the spray-drying operation to be at most 80° C., advantageously at most 70° C. and more advantageously at most 60° C.

In one embodiment of the invention, the aqueous solution or suspension is preheated to a temperature of at least 20° C. and preferably at most 80° C. before being sprayed during the spray-drying operation. In one particular embodiment, the aqueous solution or suspension is preheated to a temperature of at least 20° C. and at most 25° C. before being sprayed during the spray-drying operation.

The present invention further relates to a process for preparing alkali metal bicarbonate particles by co-grinding of the alkali metal bicarbonate in the presence of 0.1 to 20, preferably 0.1 to 10 parts by weight of a resin acid or of a fatty acid, or salts thereof, per 100 parts per weight of the substance undergoing milling. The alkali metal bicarbonate and the resin acid are preferably as defined above. That is, the preferred alkali metal bicarbonate is sodium metal bicarbonate, and the resin acid is a tricyclic diterpene carboxylic acid, preferably belong to the abietane diterpene group, and most preferred is abietic acid or a salt thereof. In the process for preparing alkali metal bicarbonate particles by co-grinding, all suitable grinding procedure as known in the art can be used. Typical devices include impact mills, which are mills in which the material be milled as subjected to the impact of moving mechanical part and that have the effect of fragmenting the particles of the material. Impact mills are well-known in the fine milling art. Such mills include hammer mills, spindle mills, attritor mills, ball mills and cage mills. Such mills are e.g. manufactured and available by Grinding Technologies and System SRL or by Hosokawa Alpine AG. Most preferred, an Alpine LGM 3 is used. In the process for preparing the alkali metal bicarbonate particles, the alkali metal bicarbonate is grinded in the presence of the additive, i.e. the resin acid as defined above. Either the total amount of bicarbonate and additive is added into the mill at once, followed by milling or preferably the bicarbonate and the additive are fed into the milling device at a constant rate. Suitable rates for the bicarbonate are 50 kg/h to 500 kg/h, preferably 100 kg/h to 400 kg/h, e.g. about 150 kg/h. The amount of additive corresponds to the weight ratio of bicarbonate and resin used. I.e., if the alkali metal bicarbonate is co-grinded in the presence of 1 part by weight of a resin acid, per 100 parts per weight of the substance undergoing milling, the feeding rate of the additive is only 1% of the feeding rate of the alkali metal bicarbonate.

The amount of additive, e.g. resin acid, in the process for preparing alkali metal bicarbonate particles by co-grinding, is 0.1 to 20, preferably 0.1 to 10 parts by weight, per 100 parts by weight of the substance undergoing milling. Below 0.1 parts by weight, there is only low efficacy of the additive. Using higher amounts than 20 parts by weight of the additive is disadvantageous for cost reasons. Further preferred amounts are 0.2-8 parts by weight of additive, more preferred 0.5-5 parts by weight of additive, even more preferred 0.8-2 parts by weight of additive, in particular about 1 part by weight of additive, each per 100 parts by weight of the substance (typically alkali metal bicarbonate and additive) undergoing milling.

The invention also relates to a process for preparing alkali metal bicarbonates by fluidized bed coating wherein the alkali metal bicarbonate is coated in the presence of 0.1 to 20, preferably 0.1 to 10 parts by weight of a resin acid a resin acid or a fatty acid, or salts thereof, or a wax per 100 parts by weight of the alkali metal bicarbonate to be coated.

The alkali metal bicarbonate and the resin acid and fatty acid are preferably as defined above. Furthermore, a wax can be used as the additive in the fluidized bed coating process of the present invention.

Waxes are chemical compounds that are malleable near ambient temperatures. Characteristically, they melt above 45° C. to give a low viscosity liquid. Waxes are insoluble in water but soluble in organic, nonpolar solvents. All waxes are organic compounds, both synthetically and naturally occurring, which consist of long alkyl chains. Natural waxes may contain esters of carboxylic acids and long chain alcohols or mixtures of substituted hydrocarbons, such as long chain fatty acids and primary alcohols. Synthetic waxes such as paraffin wax, are long-chain hydrocarbons lacking functional groups. An example for a wax used in the fluidized bed coating process of the present invention is beeswax, wherein a major component is the ester myricyl palmitate which is an ester of triacontanol and palmitic acid.

The fluidized bed coating process of the present invention is a fluidization process where a gas passes through an alkali metal bicarbonate powder or granules to expand the granular bed volume as the aerodynamic drag forces counteract the gravitational forces: the particles move away from each other. While fluidization is running, a continuous injection of the coating agent, i.e. a resin acid or a salt thereof, a fatty acid or a salt thereof or a wax, or a formulation thereof, is sprayed in the chamber of the reactor, which allows to homogeneously coat the granular or powder material, i.e. alkali metal bicarbonate with the coating agent. The process can either be led by batch or continuously. Gas injection is usually done at the chamber or reactor bottom, through a gas distribution plate. The coating agent may have to be heated to ensure it remains in liquid state until it leaves the spray nozzle. To do so, the coating agent is stirred in a separate container with a temperature controlled double jacket. Line tracing is essential to avoid clogging. Spraying of the coating agent solution can be done either at the top, the bottom or tangentially in the fluidized bed chamber.

The amount of coating agent (additive), e.g. the resin acid or a salt thereof, the fatty acid or a salt thereof, or the wax, in the process for preparing alkali metal bicarbonate particles by fluidized bed coating is 0.1 to 20, preferably 0.1 to 10 parts by weight, per 100 parts by weight of the alkali metal bicarbonate to be coated. Below 0.1 parts by weight, there is only low efficacy of the additive. Using higher amounts than 20 parts by weight, particularly 10 parts by weight of the additive is disadvantageous for cost reasons. Further preferred amounts are 0.2-8 parts by weight of additive, more preferred 0.5-5 parts by weight of additive, even more preferred 0.8-2 parts by weight of additive, in particular about 1 part by weight of additive, each per 100 parts by weight of the alkali metal bicarbonate to be coated.

The invention also relates to the alkali metal bicarbonate particles which are obtainable by the spray-drying process as described above. The alkali metal is preferably sodium or potassium, in particular sodium. The particles comprise at least 70% by weight of the alkali metal bicarbonate and less than 22% by weight of the alkali metal carbonate, i.e. the corresponding alkali metal carbonate of the alkali metal bicarbonate. That is, if the preferred alkali bicarbonate is sodium bicarbonate ($NaHCO_3$) or potassium bicarbonate ($KHCO_3$), the alkali carbonate is sodium carbonate ($Na_2CO_3$) or potassium carbonate ($K_2CO_3$), respectively. Typically, the content of water is less than 10% by weight, preferably less than 9% by weight. The content of additive, i.e. resin acid or fatty acid is 0.01-20% by weight, preferably 0.01-10% by weight, more preferably at least 0.02% by weight, even more preferably at least 0.05% by weight, in particular at least 0.1% by weight. More than 20% by weight of the additive is disadvantageous for cost reasons. Preferably, at most 8% by weight, more preferably at most 6% by weight, in particular at most 5% by weight of the additive, i.e. the resin acid or the fatty acid, present in the particles in accordance with the present invention.

The invention also relates to the alkali metal bicarbonate particles which are obtainable by the co-grinding process as described above. The alkali metal is preferably sodium or potassium, in particular sodium. The particles comprise at least 80% by weight of the alkali metal bicarbonate and less than 10% by weight of the alkali metal carbonate, i.e. the corresponding alkali metal carbonate of the alkali metal bicarbonate. That is, if the preferred alkali bicarbonate is sodium bicarbonate ($NaHCO_3$) or potassium bicarbonate ($KHCO_3$), the alkali carbonate is sodium carbonate ($Na_2CO_3$) or potassium carbonate ($K_2CO_3$), respectively. Typically, the content of water is less than 10% by weight, preferably less than 8% by weight. The content of additive, i.e. resin acid or fatty acid is 0.01-20% by weight, preferably 0.01-10% by weight, more preferably at least 0.02% by weight, even more preferably at least 0.05% by weight, in particular at least 0.1% by weight. More than 20% by weight of the additive is disadvantageous for cost reasons. Preferably, at most 8% by weight, more preferably at most 6% by weight, in particular at most 5% by weight of the additive, i.e. the resin acid or the fatty acid, present in the particles in accordance with the present invention.

The invention also relates to the alkali metal bicarbonate particles which are obtainable by the fluidized bed coating process as described above. The alkali metal is preferably sodium or potassium, in particular sodium. The particles comprise at least 70% by weight of the alkali metal bicarbonate and less than 10% by weight of the alkali metal carbonate, i.e. the corresponding alkali metal carbonate of the alkali metal bicarbonate. That is, if the preferred alkali bicarbonate is sodium bicarbonate ($NaHCO_3$) or potassium bicarbonate ($KHCO_3$), the alkali carbonate is sodium carbonate ($Na_2CO_3$) or potassium carbonate ($K_2CO_3$), respectively. Typically, the content of water is less than 10% by weight, preferably less than 8% by weight. The content of the coating agent (additive), i.e. the resin acid or salt thereof, the fatty acid or salt thereof or wax is 0.1-20% by weight, preferably 0.1-10% by weight, more preferably at least 0.2% by weight, even more preferably at least 0.5% by weight, in particular at least 1% by weight. More than 20% by weight, particularly more than 10% by weight of the additive is disadvantageous for cost reasons. Preferably, at most 8% by weight, more preferably at most 6% by weight, in particular at most 5% by weight of the additive, i.e. the resin acid or the fatty acid, present in the particles in accordance with the present invention.

Generally the alkali metal bicarbonate particles obtainable by the processes as described above have a particle size as distribution $D_{50}$ of at most 200 μm, or at most 150 μm, or at most 100 μm, or at most 50 μm. In preferred embodiments the alkali metal bicarbonate particles have a particle size as distribution $D_{50}$ of at most 25 μm, more preferably at most 20 μm, in particular in the range of 10 μm to 20 μm. The $D_{50}$ term is designating the diameter for which 50% by weight of the particles have a diameter less than or equal to $D_{50}$ (weight average diameter).

The weight-average diameter $D_{50}$, as well as $D_{10}$ and $D_{90}$ values are measured by laser diffraction and scattering on a Malvern Mastersizer S particle size analyzer using an He—Ne laser source having a wavelength of 632.8 nm and a diameter of 18 mm, a measurement cell equipped with a backscatter 300 mm lens (300 RF), and MS 17 liquid preparation unit, and an automatic solvent filtration kit ("ethanol kit") using ethanol saturated with bicarbonate (wet method).

The particles obtainable by the processes of the invention show an excellently increased dissolution time compared to the particles which not comprise the additives, i.e. the resin acid or the fatty acid. While the particles without additive show a dissolution time of about 8 seconds, the particles according to the present invention show a dissolution time of typically at least 20 seconds, preferably at least 25 seconds when obtainable by spray-drying. For particles which are obtainable by co-grinding and fluidized bed coating, preferably according to the process as described above, the dissolution time is typically at least 100 seconds, preferably at least 120 seconds, in particular at least 150 seconds. An increased dissolution time is advantageous and desired for some uses of the alkali metal bicarbonates as known in the art.

The particles obtained by the processes of the invention also show excellent $CO_2$ release properties. $CO_2$ release of the particles of the invention typically begins at a temperature of at least 95° C., preferably at a temperature of at least 100° C., more preferably at a temperature of at least 110° C., even more preferably at a temperature of at least 120° C., and particularly preferably at a temperature of at least 130° C., as determined by the TGA method described above. The $CO_2$ release typically has its maximum at a temperature of at least 125° C., preferably at a temperature of at least 130° C., more preferably at a temperature of at least 140° C., even more preferably at a temperature of at least 150° C., and particularly preferably at a temperature of at least 160° C., as determined by the TGA method described above.

The present invention also relates to the use of a resin acid or a fatty acid, or salts thereof, in particular as defined above, as additive for increasing the dissolution time of alkali metal bicarbonate particles, in particular those as described above and as obtainable by a process according to the present invention.

These advantageous properties of the particles as described above and as obtainable by the process of the invention make it possible to envisage various applications for these alkali metal bicarbonate particles. Possible applications include as blowing or foaming agent for polymers, as an exfoliating agent (health care), as anti-parasitic agent, as a deodorizing agent, as an inhalation agent, as a leaving agent for food, and as a foaming agent for polymers.

The following examples are given by way of non-limiting illustration of the present invention, and variations thereof that are readily accessible to a person skilled in the art.

EXAMPLES

Example 1

In this example spray-drying has been tested in a NIRO spray dryer. The air pre-heater consisted of four stages allowing heating the air up to 300° C. The liquid was sprayed through a rotating atomizer (8 holes; 20,000 rpm). Spray-drying chamber consisted of an upper cylinder of an internal diameter of a 1,200 mm and a total height of about 2 times the internal diameter, and a cone at the bottom of the cylinder, with an angle of 60°. The dried powder was recovered at the underflow of a cyclone (with cutoff size of about 2 µm) separating the wet air from the powder. The operating conditions of the apparatus are given in table 1:

TABLE 1 characteristics of used spray dryer

| Parameter | Operating conditions |
|---|---|
| Temperature of the drying air | 300° C. |
| Temperature of exiting wet air | 70° C. |
| Flow rate of solution or suspension | 20 kg/h |
| $NaHCO_3$ concentration in the solution or suspension | 75 g/kg |
| Solution or suspension temperature | About 20° C. |
| Type of additive | stearic acid |
| Additive concentration | 1,500 ppm |

Sodium bicarbonate particles were obtained with the following specific characteristics:
Diameter $D_{50}$: 15 m
Bulk density: 277 kg/m$^3$
$NaHCO_3$ content: 70 wt. %
$H_2O$ and additive content: 9 wt. %
$Na_2CO_3$ content: 22 wt. %
dissolution time: 29 seconds Spray-drying was furthermore performed using stearine as indicated in the following table 2:

TABLE 2 characteristics of used spray dryer

| Parameter | Operating conditions |
|---|---|
| Temperature of the drying air | 300° C. |
| Temperature of exiting wet air | 70° C. |

TABLE 2-continued characteristics of used spray dryer

| Parameter | Operating conditions |
|---|---|
| Flow rate of solution or suspension | 20 kg/h |
| $NaHCO_3$ concentration in the solution or suspension | 75 g/kg |
| Solution or suspension temperature | About 20° C. |
| Type of additive | stearine |
| Additive concentration | 5,333 ppm |

Sodium bicarbonate particles were obtained with the following specific characteristics:
Diameter $D_{50}$: 12.4 µm
Bulk density: 356.6 kg/m$^3$
dissolution time: 417 seconds
$CO_2$ release beginning temperature 95.4° C. (as determined by the TGA method described above, i.e. heating from 35 to 250° C. at a rate of 10° C./min)
$CO_2$ release maximum temperature: 128.2° C. (as determined by the TGA method as described above, i.e. heating from 35 to 250° C. at a rate of 10° C./min).

When as comparison example no additive is added to the solution or suspension before spray-drying, the sodium bicarbonate particles were obtained having the following characteristics:
Diameter $D_{50}$: 15 µm
Bulk density: 185 kg/m$^3$
$NaHCO_3$ content: 63 wt. %
$H_2O$ content: 1 wt. %
$Na_2CO_3$ content: 36 wt. %
dissolution time: 7.9-11 seconds
$CO_2$ release beginning temperature 111° C. (as determined by the TGA method described above, i.e. heating from 35 to 250° C. at a rate of 10° C./min)
$CO_2$ release maximum temperature: 132.7° C. (as determined by the TGA method as described above, i.e. heating from 35 to 250° C. at a rate of 10° C./min).

Therefore, the sodium bicarbonate particles according to the present invention show an excellently increased dissolution time.

Example 2

In this example, co-grinding of sodium bicarbonate particles with stearic acid as additive has been tested. A commercial grade of sodium bicarbonate is used to feed a grinder (Alpine LGM-3). The additive is an emulsion of stearic acid. The following flow rates are used:
sodium bicarbonate flow rate: 150 kg/h
stearin emulsion: 1.5 kg/h (1% in the final product) or 3.0 kg/h (2% in the final product)

The sodium bicarbonate particles were obtained with the following specific characteristics:

| characteristic | bicarbonate + 1% stearic acid | bicarbonate + 2% stearic acid |
|---|---|---|
| diameter $D_{50}$ | 20 µm | 18 µm |
| bulk density | 1,116 kg/m$^3$ | 1,040 kg/m$^3$ |
| $NaHCO_3$ content | 89.7% | 88.4% |
| $H_2O$ content | 5.7% | 6.5% |
| $Na_2CO_3$ content | 4.6% | 5.1% |
| dissolution time | 138 seconds | 178 seconds |

This data confirms that the particles of the present invention, in particular those obtainable by co-grinding show an excellently increased dissolution time.

Example 3

In this example, co-grinding of sodium bicarbonate particles with rosin acid as the additive at different concentrations was tested. A commercial grade of sodium bicarbonate was used to feed a grinder (Alpine LGM-3). The additive was an emulsion of rosin acid. The following flow rates were used:
sodium bicarbonate flow rate: 150 kg/h
rosin acid emulsion: 3.0 kg/h (0.2% in the final product), 7.5 kg/h (0.5% in the final product), 15 kg/h (1% in the final product) or 30 kg/h (2% in the final product).

When the additive was added in the bottom of the grinding chamber, sodium bicarbonate particles were obtained with the following specific characteristics:

| characteristic | Rosin Acid 0.2 wt. % | Rosin Acid 0.5 wt. % | Rosin Acid 1 wt. % | Rosin Acid 2 wt. % |
|---|---|---|---|---|
| diameter $D_{50}$ [µm] | 20.5 | 16.4 | 18.8 | 22.3 |
| bulk density [kg/m$^3$] | 959.8 | 850 | 841.6 | 813.6 |
| Specific area [m$^2$/g] | 0.3 | 0.4 | 0.3 | 0.2 |
| NaHCO$_3$ [wt. %] | 94 | 96 | 93 | 69 |
| Na$_2$CO$_3$ [wt. %] | 3 | 2 | 4 | 2 |
| H$_2$O [wt. %] | less than 2 | less than 2 | less than 3 | less than 28 |
| dissolution time [s] | 15.8 | 20.7 | 35.0 | 67.4 |

When the additive was added in the middle of the grinding chamber, sodium bicarbonate particles were obtained with the following specific characteristics:

| characteristic | Rosin Acid 0.2 wt. % | Rosin Acid 0.5 wt. % | Rosin Acid 1 wt. % | Rosin Acid 2 wt. % |
|---|---|---|---|---|
| diameter $D_{50}$ [µm] | 20.8 | 16.1 | 17.3 | 18.3 |
| bulk density [kg/m$^3$] | 985 | 832.2 | 832.4 | 765.6 |
| Specific area [m$^2$/g] | 0.3 | 0.4 | 0.3 | 0.3 |
| NaHCO$_3$ [wt. %] | 97 | 95 | 93 | 92 |
| Na$_2$CO$_3$ [wt. %] | 1 | 3 | 4 | 4 |
| H$_2$O [wt. %] | less than 1 | less than 2 | less than 3 | less than 4 |
| dissolution time [s] | 19.5 | 22.3 | 17.8 | 29.1 |

When as comparison example no additive emulsion is added to the co-grinding process, sodium bicarbonate particles were obtained having the following characteristics:
Diameter $D_{50}$: 18 m
Bulk density: 600 kg/m$^3$
NaHCO$_3$ content: 94 wt. %
H$_2$O content: less than 2 wt. %
Na$_2$CO$_3$ content: 4 wt. %
dissolution time: 5 seconds Accordingly, the data obtained in Example 3 confirms that the particles according to the present invention obtained by co-grinding show an excellently increased dissolution time.

Example 4

In this example, sodium bicarbonate particles were obtained in a fluidized bed coating process using stearine and beeswax as the additives.

The operating conditions of the fluidized bed apparatus are as follows: Fluidization is made in an AEROMATIC FIELDER fluidization chamber with a batch of 1 kg sodium bicarbonate and a relative pressure of 0.5 to 2 bar of fluidization air (at room temperature) put at the chamber bottom, through a gas distribution plate. The coating material is heated in a stirred double jacketed beaker at a temperature of 105° C. (beeswax) and 130° C. (stearine) above the coating material melting point. The coating liquid is continuously fed to a PNR SUB 1520 spray nozzle put at the top of the fluidization chamber, oriented to the bottom. The liquid line is temperature-controlled with a tracing line. Some hot air feeds the spray nozzle as well. It is previously heated at 200° C. in order to ensure at least a 110° C. temperature when reaching the nozzle. Air pressure is led at 1 relative bar and liquid flow is fixed at 42 mL/min in order to spray. Fluidization air pressure is controlled to ensure proper fluidization during the whole batch time. Spraying is stopped when the required amount of coating material is added to the sodium bicarbonate. Fluidization is stopped 5 minutes after the spraying period. Coated sodium bicarbonate is then gathered from the fluidization chamber.

The sodium bicarbonate particles were obtained with the following specific characteristics:

| characteristic | Stearine 20,000 mg/kg | Beeswax 20,000 mg/kg |
|---|---|---|
| bulk density [kg/m$^3$] | 866.1 | 761.6 |
| dissolution time [s] | 189.1 | 96.3 |
| CO$_2$ release beginning temperature [° C.] | 139.7 | 135.6 |
| CO$_2$ release maximum temperature [° C.] | 165.4 | 159.0 |

TGA method: 35 to 250° C.; 10° C./min speed

Accordingly, the data obtained in Example 4 confirms that the particles according to the present invention obtained in a fluidized bed coating process show an excellently increased dissolution time.

Furthermore, the data obtained in Example 4 shows that the CO$_2$ release properties are excellent in the particles according to the present invention, particularly those obtained in the fluidized bed coating process.

The invention claimed is:

1. A process for producing alkali metal bicarbonate particles comprising:
co-grinding of an alkali metal bicarbonate in the presence of 0.1 to 20 parts by weight of a resin acid, per 100 parts by weight of the alkali metal bicarbonate
wherein the resin acid is selected from the group consisting of abietic acid (abieta-7,13-dien-18-oic acid), neoabietic acid, dehydroabietic acid, and palustric acid; and
wherein the alkali metal bicarbonate particles are suitable as foaming agents for polymers.

2. The process for preparing alkali metal bicarbonate particles according to claim 1, wherein the particles have a particle size distribution of $D_{50}$ of at most 200 µm.

3. The process for preparing alkali metal bicarbonate particles according to claim 1, wherein the particles have a particle size distribution of $D_{50}$ in the range of 10 µm to 20 µm.

4. The process for preparing alkali metal bicarbonate particles according to claim 1, wherein the particles have a dissolution time in the range of 20 to 200 seconds.

5. The process for preparing alkali metal bicarbonate particles according to claim 1, wherein the particles show a $CO_2$ release maximum temperature of at least 125° C., as determined by thermogravimetric analysis (TGA).

6. Alkali metal bicarbonate particles, having a particle size distribution of $D_{50}$ of at most 200 μm, a dissolution time in the range of 20 to 200 seconds, and a $CO_2$ release maximum temperature of at least 125° C., as determined by thermogravimetric analysis (TGA).

7. Alkali metal bicarbonate particles, produced by the process of claim 1,
wherein the process comprises co-grinding to make particles comprising:
at least 80% by weight of alkali metal bicarbonate,
less than 10% by weight of alkali metal carbonate, less than 10% by weight of water, and 0.1 to 20% by weight of the resin acid.

8. The alkali metal bicarbonate particles according to claim 7, wherein the particles have a particle size distribution of $D_{50}$ of at most 200 μm.

9. The alkali metal bicarbonate particles according to claim 7, wherein the particles have a particle size distribution of $D_{50}$ in the range of 10 μm to 20 μm.

10. The alkali metal bicarbonate particles according to claim 7, wherein the particles show a dissolution time in the range of 20 to 200 seconds.

11. The alkali metal bicarbonate particles according to claim 7, wherein the particles show a $CO_2$ release maximum temperature of at least 125° C., as determined by thermogravimetric analysis (TGA).

12. The alkali metal bicarbonate particles according to claim 7, being used as a leavening agent for food and as a foaming agent for polymers.

13. A method for increasing dissolution time of alkali metal bicarbonate particles, comprising spray-drying or co-grinding or fluidized bed coating alkali metal bicarbonate in the presence of an additive selected from the group consisting of a resin acid, a fatty acid, and a wax.

14. The alkali metal bicarbonate particles according to claim 6, comprising from 0.01 to 20% by weight of a resin acid.

15. The alkali metal bicarbonate particles according to claim 6, comprising a resin acid, wherein the resin acid is selected from the group consisting of abietic acid (abieta-7,13-dien-18-oic acid), neoabietic acid, dehydroabietic acid, and palustric acid.

* * * * *